United States Patent
Gupta et al.

(10) Patent No.: US 10,165,329 B2
(45) Date of Patent: Dec. 25, 2018

(54) METHODS AND SYSTEMS FOR PLAYING MEDIA

(71) Applicant: Rovi Guides, Inc., San Carlos, CA (US)

(72) Inventors: Vikram Makam Gupta, Bangalore (IN); Ashwini Dharwa, Ratlam (IN); Raghavendra Goddumarri, Anantapuramu (IN); Vishal Agarwal, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/345,285

(22) Filed: Nov. 7, 2016

(65) Prior Publication Data

US 2017/0118523 A1    Apr. 27, 2017

Related U.S. Application Data

(63) Continuation of application No. 14/861,332, filed on Sep. 22, 2015, now Pat. No. 9,521,455.

(51) Int. Cl.
*H04N 21/472* (2011.01)
*H04N 21/258* (2011.01)
(Continued)

(52) U.S. Cl.
CPC ..... *H04N 21/47217* (2013.01); *G11B 27/031* (2013.01); *G11B 27/36* (2013.01); *H04L 65/4084* (2013.01); *H04N 19/132* (2014.11); *H04N 19/156* (2014.11); *H04N 19/162* (2014.11); *H04N 19/172* (2014.11); *H04N 19/895* (2014.11); *H04N 21/25833* (2013.01); *H04N 21/25883* (2013.01); *H04N 21/278* (2013.01); *H04N 21/4122* (2013.01); *H04N 21/4302* (2013.01); *H04N 21/4334* (2013.01); *H04N 21/4358* (2013.01); *H04N 21/44004* (2013.01); *H04N 21/44016* (2013.01); *H04N 21/44029* (2013.01); *H04N 21/44204* (2013.01); *H04N 21/440218* (2013.01); *H04N 21/4532* (2013.01); *H04N 21/6336* (2013.01); *H04N 21/6379* (2013.01); *H04N 21/6587* (2013.01);
(Continued)

(58) Field of Classification Search
CPC ....... H04N 21/47217; H04N 21/25833; H04N 21/25883; H04N 21/4122; H04N 21/4334; H04N 21/4358; H04N 21/440218; H04N 21/44204; H04N 21/4532; H04N 21/6336; H04N 21/6379; H04N 21/84; H04N 21/8456; H04N 21/85406; H04N 19/132; H04N 19/156; H04N 19/162; H04N 19/172; H04N 19/895; H04L 65/4084
See application file for complete search history.

(56) References Cited

U.S. PATENT DOCUMENTS 9,386,352 B1 *  7/2016  Shoykhet ......... H04N 21/23439
2008/0127285 A1 *  5/2008  Broberg ........... H04N 21/23430
                                                          725/105
(Continued)

*Primary Examiner* — Randy A Flynn
(74) *Attorney, Agent, or Firm* — Haley Guiliano LLP

(57) ABSTRACT

Methods and systems are described for a media guidance application that enables a user to patch corrupted media. In particular, the media guidance application place-shifts a frame of a second version of the media corresponding to a corrupted portion of the media from a remote location and displays the place-shifted data at the local device.

20 Claims, 8 Drawing Sheets

(51) Int. Cl.

| | |
|---|---|
| *H04N 21/278* | (2011.01) |
| *H04N 21/41* | (2011.01) |
| *H04N 21/43* | (2011.01) |
| *H04N 21/433* | (2011.01) |
| *H04N 21/435* | (2011.01) |
| *H04N 21/44* | (2011.01) |
| *H04N 21/4402* | (2011.01) |
| *H04N 21/442* | (2011.01) |
| *H04N 21/45* | (2011.01) |
| *H04N 21/6336* | (2011.01) |
| *H04N 21/6379* | (2011.01) |
| *H04N 21/6587* | (2011.01) |
| *H04N 21/84* | (2011.01) |
| *H04N 21/845* | (2011.01) |
| *H04N 21/854* | (2011.01) |
| *H04N 19/132* | (2014.01) |
| *H04N 19/156* | (2014.01) |
| *H04N 19/162* | (2014.01) |
| *H04N 19/172* | (2014.01) |
| *H04N 19/895* | (2014.01) |
| *H04L 29/06* | (2006.01) |
| *G11B 27/031* | (2006.01) |
| *G11B 27/36* | (2006.01) |

(52) U.S. Cl.
CPC ......... *H04N 21/84* (2013.01); *H04N 21/8456* (2013.01); *H04N 21/85406* (2013.01)

(56) References Cited

U.S. PATENT DOCUMENTS

| | | | |
|---|---|---|---|
| 2008/0201748 A1* | 8/2008 | Hasek | H04N 7/17309 725/98 |
| 2009/0102926 A1 | 4/2009 | Bhogal et al. | |
| 2010/0180316 A1* | 7/2010 | Hasegawa | H04N 7/17318 725/118 |
| 2011/0225454 A1* | 9/2011 | Fan | H04N 5/76 714/15 |
| 2014/0365685 A1* | 12/2014 | Bangma | H04L 67/1095 709/248 |
| 2015/0071620 A1* | 3/2015 | Keohane | H04N 21/4425 386/287 |
| 2016/0029074 A1* | 1/2016 | Jayamanne | H04N 21/4334 386/297 |
| 2016/0105689 A1* | 4/2016 | Sorlander | H04N 21/6143 375/240.27 |

* cited by examiner

600

```
600 ...
601 Initialization Subroutine
602 ...
603 //Routine to identify a portion of the media asset for place-shifting from a remote
        device to a local device based on detecting a corrupted frame in a buffer of the
        local device:
604
605  Receive the next non-corrupted frames from the buffer of the local device
606  For each frame of the media asset added to the buffer:
607    A = Accessed array of the non-corrupted frames of the buffer
608    B = Accessed threshold minimum percentage of buffer frames that are non-
       corrupted
609         If (A.length/total buffer size <=B)
610              Execute Subroutine to place-shift frames of a remote version of the
       media asset corresponding to all frames of the buffer using control circuitry
611         Else
612              Execute Subroutine to identify a first non-corrupted frame in the
       buffer following a first corrupted frame in the buffer using control circuitry
613              Execute Subroutine to place-shift frames of a remote version of
       the media asset corresponding to the frames between the first corrupted frame
       and the first non-corrupted frame in the buffer using control circuitry
614  Execute Subroutine to clear the buffer
615 ...
616 Termination Subroutine
617 ...
```

800 ...
801 Initialization Subroutine
802 ...
803 //Routine to search a database to identify a remote version of a media asset based on detecting a corrupted frame corresponding to the media asset:
804
805 Receive playback position corresponding to a corrupted frame of a local media asset
806 For each playback position:
807     Query database containing locations of remote devices having access to alternate versions of the media asset, each having a corresponding playback position
808         If (Number of matching entries > 0)
809             Retrieve locations of remote devices from database entries matching the playback position
810             Execute Subroutine to place-shift a frame of the remote version at the playback position to the local device using control circuitry
811         Else If (Number of similar entries > 0)
812             Execute Subroutine to access the remote version at the playback position and place-shift a frame of the remote version to the local device using control circuitry
813         Else
814             Execute Subroutine to commence playback of a remote version at the playback position by a remote device and place-shift a frame of the remote version to the local device using control circuitry
815 Execute Subroutine to generate for display the place-shifted frames using control circuitry
816 ...
817 Termination Subroutine
818 ...

FIG. 8

METHODS AND SYSTEMS FOR PLAYING MEDIA

CROSS-REFERENCE TO RELATED APPLICATIONS

This application is a continuation of U.S. patent application Ser. No. 14/861,332, filed Sep. 22, 2015, currently allowed, which is hereby incorporated by reference in its entirety.

BACKGROUND

In conventional systems, a user may select to record a TV program for viewing at a later time. Sometimes a system may experience technical difficulties during recording of the television program (e.g., a power outage), which may lead to a partial or corrupted recording. When the user decides to view the recorded TV program the user may discover that the recording is corrupt. Oftentimes, a user is left with no choice but to wait for the program to air again or to watch the corrupted version of the program. This may result in a subpar viewing experience for the user because the user must either search for and schedule the program to be recorded again at a later time or must view the corrupted program.

SUMMARY

Accordingly, methods and systems are described herein for a media guidance application that may patch a media asset that is corrupted. For example, the media guidance application may receive a user request to record a media asset, such as an episode of the television show "Dr. Who." While recording the media asset, the media guidance application may detect a signal outage, which prevents a portion of the episode from getting recorded by the media guidance application. During playback of the recorded media asset, the media guidance application may detect a corrupted portion (e.g., missing data due to the signal outage) of the recording. The media guidance application may search for a second version of the media asset (e.g., a non-corrupted version of the media asset) to generate for display in place of the corrupted data. In particular, the media guidance application may identify a remote server having a second version of the media asset (e.g., a non-corrupted version of the episode of "Dr. Who") and the media guidance application may request a place-shifted frame of the second version to generate for display at a display, such as a television, connected to the media guidance application.

In some aspects, the media guidance application may retrieve a frame of a plurality of frames corresponding to a local version of a media asset from a memory of a local device. For example, the media guidance application may retrieve a request to play back a media asset that was previously scheduled for recording. The media guidance application may retrieve from, for example, a local hard drive or a locally accessible cloud storage drive a frame of a plurality of frames corresponding to the media asset that was previously scheduled for recording, such as a frame of a plurality of frames arranged sequentially in a video file corresponding to an episode of "Dr. Who."

The media guidance application may compute a checksum for the frame. For example, the media guidance application may compute a checksum for the frame by, for example, enumerating all "1" bits in a data portion of a frame. For example, the media guidance application may sum all of the "1" bits corresponding to video pixel data in a frame (i.e., excluding any header portion, padding, etc., in the frame) to derive a computed checksum value. The media guidance application may use the computed sum to compare the value against an expected sum (e.g., a checksum value transmitted with the frame).

The media guidance application may compare the checksum to frame data to determine whether the frame is corrupt. For example, the media guidance application may access data at the end of a frame (e.g., a checksum field of the frame) representative of a number of "1" bits in the frame for the comparing. The media guidance application may compare the computed checksum to the checksum field of the frame. If the media guidance application determines that the checksums are equal, the media guidance application may determine that there is no corruption in the frame. If the checksum field of the frame does not equal the computed checksum value, the media guidance application may determine that the frame is corrupt (i.e., at least one of the bits of the frame was flipped).

In response to determining that the frame is corrupt, the media guidance application may identify a playback position of the media asset corresponding to the frame. For example, the media guidance application may play back the frames in a sequence defined by file encoding of the media asset. The media guidance application may buffer (e.g., store in a memory) the last non-corrupted frame and may access data corresponding to the last non-corrupted frame to identify a playback position in the media asset. For example, the media guidance application may identify a frame number of the frame corresponding to a position in the sequence of all the frames.

The media guidance application may search a database listing a plurality of remote devices accessing remote versions of the media asset to identify a remote device accessing a remote version of the media asset a the playback position. For example, the media guidance application may query a central database, such as a database listing a location of all media assets that are registered to the database, to identify locations having a version of the media asset. The media guidance application may transmit a query to a location to determine a playback position at the location. For example, the media guidance application may query the database and may retrieve an IP address associated with a computer having stored a version of the media asset. The media guidance application may generate and transmit a packet to the computer at the retrieved IP address requesting a current playback position of the version at the computer. The media guidance application may query multiple devices (e.g., computers, set-top boxes, etc.) at multiple locations (e.g., IP addresses) to identify a remote device accessing a version of the media asset at the playback position.

In response to identifying the remote device, the media guidance application may place-shift a frame of the remote version corresponding to the playback position from the remote device to the local device (e.g., media guidance application). For example, the media guidance application may transmit a packet to a computer at a location accessible to the media guidance application. The media guidance application may request a place-shifted frame of the remote version by, for example, requesting a re-encoded video frame corresponding to the version of the media asset.

The media guidance application may generate for display at the local device the place-shifted frame. For example, the media guidance application may generate for display at a display screen connected to the media guidance application the place-shifted frame by, for example, decoding the place-shifted frame and modifying the frame data to a format that may be rendered at a display (e.g., television) connected to the media guidance application.

In some embodiments, the media guidance application may receive, at the local device, a current playback position of the remote version, wherein the current playback position corresponds to a progress of the remote version at the remote device. For example, the media guidance application may receive in a packet transmitted from a remote device a playback position, such as a progress, a time or a frame number, corresponding to a progress in a version of the media asset being played back at a remote device.

In response to determining that the current playback position is not equal to the playback position, the media guidance application may instruct the remote device to play the remote version from the playback position. For example, the media guidance application may determine that the current playback position of the remote version is not equal to the playback position of the media asset by comparing a frame number, progress or time of the media asset to a frame number, progress or time of the remote version. The media guidance application may synchronize the remote version with the media asset by, for example transmitting a packet to the remote device comprising the playback position of the media asset along with an instruction to jump or fast-forward to the playback position.

In some embodiments, the media guidance application may determine, in response to searching the database, that no remote devices are accessing remote versions of the media assets. For example, the media guidance application may query the server comprising locations of all media asset for a list of locations of remote versions of the media asset. The media guidance application may transmit a packet to each location returned from the database requesting a current playback position of the media asset. The media guidance application may determine that no remote devices are accessing remote versions of the media asset by, for example, not receiving any responses to the transmitted packet or by receiving data indicating that the remote device is not accessing the media asset.

In some embodiments, in response to determining that no remote devices are accessing the remote versions of the media asset, the media guidance application may instruct one of the remote devices to begin playback of the remote version at the position. For example, the media guidance application may transmit a packet to a remote device comprising a play instruction coupled with data indicating a position to commence playback so that the remote device may begin playback of the remote version at the position.

In some embodiments, instructing the one of the remote devices to begin playback of the remote versions with the media guidance application further comprises instructing the one of the remote devices to tune to a channel broadcasting the remote version. For example, the media guidance application may transmit a packet to an IR encoder at the remote device to cause the IR encoder to emulate a channel change from a remote control of the remote device. The media guidance application may request a place-shifted frame of the remote version once the tuning operation is complete.

In some embodiments, instructing the one of the remote devices to begin playback of the remote versions with the media guidance application further comprises instructing the one of the remote devices to request an on-demand version of the media asset. For example, the media guidance application may transmit a packet over an IP network to a remote device, such as a set-top box, containing instructions for the set-top box to order a video-on-demand version of the media asset. The media guidance application may request a place-shifted frame of the remote version once the media asset is ordered. In another example, the media guidance application may request a version of a media asset stored on the remote device, such as a recorded or downloaded version. The media guidance application may request a place-shifted frame of the remote version.

In some embodiments, the media guidance application may perform a fast-access playback operation on the on-demand version of the media asset to locate the playback position. For example, the media guidance application may perform a fast-forward operation on the media asset to seek to the playback position. Once at the playback position, the media guidance application may instruct the remote device to begin playback of the media asset at a typical playback speed (e.g., a playback speed for viewing the media asset defined in the file of the remote version).

In some embodiments, the media guidance application may access a remote version of the media asset wherein the remote version differs from the local version by at least one of media format, resolution, aspect ratio, and total media content. For example, the media guidance application may access a second version of the media asset that may contain commercials that are not present in the local version of the media asset (i.e., different media content). In another example, the media guidance application may access a second version of the media asset that is encoded in a different format that the local version of the media asset. For example, the local version of the media asset may be encoded in an H.264 but the remote version of the media asset may be encoded in H.265 format. The media guidance application may request a place-shifted version of the remote media asset in a third format, such as MPEG-2. The media guidance application may request a specific format to save bandwidth, minimize decoding time, increase compatibility, etc.

In some embodiments, the media guidance application may retrieve an encoding capability of the remote device and a decoding capability of the local device. For example, the media guidance application may query the remote device for a listing of formats for which the remote device is able to encode media (e.g., H.264). The media guidance application may retrieve from a local memory of the local device a listing of media formats that can be decoded by the local device (e.g., H.264). The media guidance application may use the capabilities of the remote which complement the capabilities of the local device to identify an encoding format for the place-shifted frame.

In some embodiments, the media guidance application may compare the encoding capability of the remote device to the decoding capability of the local device to identify a mutually compatible encoding format. For example, the media guidance application may determine that the remote device is capable of encoding media in H.264 format and that the local device is capable of decoding H.264 format as described above. The media guidance application may determine that H.264 is a mutually compatible encoding format since it can be encoded by the remote device and be decoded by the local device.

In some embodiments, the media guidance application may determine performance capabilities of a communication channel utilized by the local device for communication to the remote device. For example, the media guidance application may perform network tests such as a ping test or a download/upload test to determine a network latency and throughput. The media guidance application may determine an encoding parameter based on the performance capabilities. For example, the media guidance application may determine that a network is slow (e.g., a measured throughput of the network is less than a threshold minimum value for network speed). In response to determining that the network is slow. The media guidance application may determine an encoding parameter that increases encoding compressing to minimize the throughput requirement necessary to transmit the encoded media.

In some embodiments, the media guidance application may place-shift, from the remote device to the local device, a frame of the remote version encoded in the encoding format based on the encoding parameter. For example, the media guidance application may place-shift from the remote device to the local device the frame, wherein the frame is encoded, at the remote device, in the mutually compatible encoding format using the encoding parameter (e.g., compression level as described above).

In some embodiments, the media guidance application may store a plurality of frames corresponding to the local version in a buffer of the local device. For example, the media guidance application may store a portion of the local version of the media file in a memory of the media guidance application to be able to quickly access the frames when necessary.

In some embodiments, the media guidance application may enumerate a number of frames stored in the buffer that are corrupt. For example, the media guidance application may compare a checksum, as described above, to determine if a frame of a plurality of frames stored in the buffer is corrupt. The media guidance application may proceed for each frame of the plurality of frames in the buffer to determine a number of frames in the buffer that are corrupt.

In some embodiments, the media guidance application may determine that a threshold number of frames in the buffer are corrupt. For example, the media guidance application may compare the number of corrupt frames in the buffer, as enumerated above, to a threshold maximum value of corrupt frames retrieved from memory. The media guidance application may request a place-shifted version of all the frames in the buffer if the number of corrupt frames exceeds the threshold maximum to maximize playback performance.

In some embodiments, the media guidance application may identify a current playback position of the local version in response to determining that the threshold number of frames are corrupt. For example, the media guidance application may identify a playback position by identifying a frame number corresponding to the local version of the media asset and comparing the frame number to a database listing a time position in the local media asset. The media guidance application may use the playback position to request a place-shifted version of the media asset at the playback position.

In some embodiments, the media guidance application may place-shift, from the remote device to the local device, all frames of the remote version corresponding to the frames in the buffer. For example, the media guidance application may request from one of the remote devices place-shifted frames of the remote version corresponding to the frames in the buffer. The media guidance application may generate for display the place-shifted frames by replacing the frames in the buffer with the place-shifted frames and generating for display the frames in a playback sequence defined by the media asset.

In some embodiments, the media guidance application may generate for display the place-shifted frames. For example, the media guidance application may generate for display on a display screen accessible to the media guidance application the place-shifted frames requested by the media guidance application instead of generating for display the frames in the buffer as described above.

In some embodiments, the media guidance application may share a local area network ("LAN") with one of the remote devices. For example, the media guidance application may communicate with the remote device without accessing a wide area network ("WAN") also accessible to the local device.

In some embodiments, the media guidance application may receive a place-shifted frame of the remote version in a first format, wherein the remote version was re-encoded at the remote device from a second format for streaming over a network connection between the local device and the remote device. For example, the media guidance application may receive a place shifted-frame of the remote version in a format, such as a frame encoded using H.264 standards, wherein the frame was converted at the remote device from a second format, such as Audio Video Interleave ("AVI") format, for streaming over the network connection between the local and remote devices. The media guidance application may request a different format to enhance system performance.

In some embodiments, the media guidance application may receive a place-shifted frame of the remote version wherein the frame is re-encoded to at least one of a lower frame rate or lower resolution than a respective frame rate or respective resolution of the local version. For example, the local version of the media asset may be encoded in using the H.264 format at 4K resolution and 60 frames per second. The place-shifted frame received by the media guidance application may be encoded using H.264 at 1080p resolution and 30 frames per second. The media guidance application may automatically generate for display the frames of the remote version in place of frames of the local version.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is pseudocode illustrative of an algorithm for identifying a portion of a media asset for place-shifting in accordance with some embodiments of the disclosure;

FIG. 8 is pseudocode illustrative of an algorithm for searching a database to identify a remote version of a media asset in accordance with some embodiments of the disclosure;

DETAILED DESCRIPTION OF DRAWINGS

Figure 1:
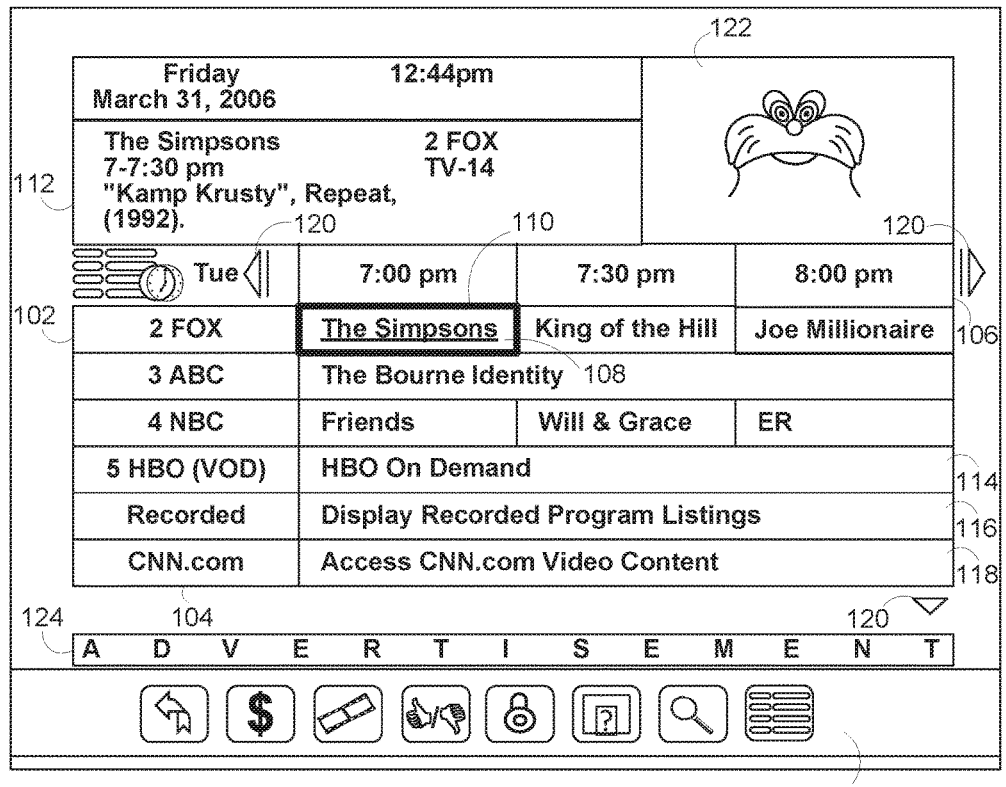
FIG. 1 shows an illustrative example of a media guidance display that may be presented in accordance with some embodiments of the disclosure.

Methods and systems are described herein for a media guidance application that can patch a corrupted recording. In particular, the media guidance application may place-shift frames of the corrupted recording from a remote version of the recording and may generate for display the place-shifted frames in place of the corrupted frames. For example, the media guidance application may access a recording of the television show "Dr. Who" on a local storage device of the media guidance application. The media guidance application may detect that the recording is corrupt during playback of the media asset (e.g., the media guidance application may determine only 45 minutes of an hour-long show was recorded). In response to detecting that the recording is corrupted, the media guidance application may search for a second version of the recording to place-shift frames of the second version to render instead of the corrupted frames of the recording. In particular, the media guidance application may identify a remote server having a second version of the recording (e.g., a non-corrupted version of the episode of "Dr. Who") wherein the second version is at a playback position equal to the playback position at the local device. The media guidance application may request place-shifted frames of the second version to generate for display at a television connected to the media guidance application in place of the corrupted frames.

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

As referred to herein, "place-shifting" means accessing data that is stored in a first location for use at a second location. For example, place-shifting a media asset may comprise accessing data of a media asset from a remote server for playback on a local device. For example, a place-shifted frame of a media asset may be a frame of media asset that is re-encoded for streaming over a network connection. In another example, the media guidance application may request a place-shifted frame of a media asset by requesting an exact copy of the frame of a media asset that is currently being rendered at a display of a remote device.

As referred to herein, a "frame" means a portion or segment of a larger group of data. For example, a frame of a song may be the first 15 seconds of a three-minute-long song. As another example, a frame may be a single image comprising a snapshot of a series of snapshots that make up a video.

As referred to herein, a "local device" is a device that may directly share multiple resources with the media guidance application. For example, a local device may be a set-top box, phone, tablet, computer, etc., running the media guidance application having a shared memory, processor or display.

As referred to herein, a "remote device" is a device that does not directly share multiple resources with the media guidance application. For example, a remote device may be a computer on a local area network ("LAN") connected to a device running the media guidance application. In another example, a remote device may be a cell phone accessible to the media guidance application via a wide area network ("WAN") connection of a device running the media guidance application.

In some embodiments, a user may use a media guidance application to playback a corrupted media asset. As referred to herein, a "media guidance application" is an application that enables users to access media content through an interface. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content. In some examples, a media guidance application may enable a use to locate and request playback of a media asset through a graphical user interface of the media guidance application.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a wearable device, a portable video player, a portable music player, a portable gaming machine, a smartphone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the media guidance application may receive a frame of a plurality of frames corresponding to a local version of a media asset from a memory of a local device. For example, the media guidance application may receive a request from a user (e.g., at an input device accessible to the media guidance application) to play back a television show recorded by the media guidance application. The media guidance application may commence playback of the media asset by retrieving a first frame of a plurality of frames corresponding to the media asset. For example, the media guidance application may retrieve an image of a plurality of images in a sequence forming a video corresponding to the media asset. The media guidance application may retrieve the frame from a memory of a local device (e.g., a device running the media guidance application). For example, the media guidance application may retrieve the frame from a hard drive of the device running the media guidance application. In another example, the media guidance application may retrieve the frame from a server accessible to the media guidance application. For example, the media guidance application may retrieve the frame by, for example, generating a query requesting the frame from a server hosting the media asset.

In some embodiments, the media guidance application may store a frame of the plurality of frames in a buffer of the local device. For example, the media guidance application may have access to fast random access memory ("RAM") and may store frames of the plurality of frames in the RAM for rapid access. For example, the media guidance application may store a frame of the plurality of frames in a buffer so that the media guidance application may be able to perform quick operations on the frames, such as identifying whether a frame is corrupted.

In some embodiments, the media guidance application may compute a checksum for the frame. For example, the media guidance application may compute a checksum for the frame by, for example, enumerating all "1" bits in a data portion of a frame. For example, the media guidance application may sum all of the "1" bits corresponding to video data in the frame (e.g., excluding any header portion or padding in the frame) to derive a computed checksum value. However, this is just an exemplary method for computing a checksum of the frame; one of ordinary skill in the art will be able to identify that other suitable methods could be used for computing the checksum.

In some embodiments, the media guidance application may compare the checksum to frame data to determine whether the frame is corrupt. For example, the media guidance application may compare the computed checksum value to a field of the frame comprising a checksum for the frame. The media guidance application may determine that a frame is corrupt if the checksum of the frame is not equivalent to the computed checksum.

In some embodiments, the media guidance application may determine that the frame is corrupt by accessing metadata corresponding to the media asset. For example, the media guidance application may detect a power outage during recording of a media asset. The media guidance application may store data indicating that a power outage occurred and may have corrupted the recording in a metadata file corresponding to the media asset. The media guidance application may determine that the recording is corrupted by, for example, comparing a time corresponding to the recorded frame with a time corresponding to the power outage (e.g., stored in metadata). If the time of the frame corresponds to a time of the power outage, then the media guidance application may determine that the frame is corrupt.

In some embodiments, the media guidance application may determine whether a media asset is corrupt by determining if a total length of the media asset is less than an expected length for the media asset. For example, the media guidance application may determine that a recording of an episode for the television show "Dr. Who" should be one hour in length. (e.g., by accessing a media database comprising lengths of media assets) The media guidance application may compare the length (one hour) with the length of a recording of an episode of the television show "Dr. Who" to determine if the recording is corrupted. For example, if the recording is 45 minutes, (i.e., less than one hour) the media guidance application may determine that the recording is corrupted.

In some embodiments, the media guidance application may determine whether a recording is corrupted by monitoring image data corresponding to a frame. For example, the media guidance application may access color information corresponding to a frame of a media asset. The media guidance application may monitor changes in the colors between frames to detect changes in colors that are greater than a threshold value for a threshold amount of time. For example, the media guidance application may determine a pixel of the frame only changes between black and white over the course of 90 frames. The media guidance application may determine that the 90 frames are corrupted (for example, if only static was recorded). In another example, the media guidance application may use multiple pixels of the frame to determine whether a frame is corrupted. For example, the media guidance application may determine whether a threshold number of pixels have not changed color. For example, the media guidance application may determine that if 50% of the pixels of a frame do not change color over 90 frames than the 90 frames may be corrupted (e.g., a television program may have frozen during recording).

In some embodiments, in response to determining that the frame is corrupt, the media guidance application may identify a playback position of the media asset corresponding to the frame. For example, the media guidance application may identify a playback position by, for example, retrieving a sequence of the frames comprising the media asset and identifying a position of the frame in the overall sequence of frames. For example, each frame may be identified by a number representing a position of the frame in the media asset. The media guidance application may use the frame number as the playback position.

In some embodiments, the media guidance application may use a relative time to identify a playback position of the media asset. For example, a recording of the media asset may comprise commercials that are not present in other versions of the media asset. The media guidance application may use metadata of the recording (i.e., data identifying commercial breaks in the recording) and a time position corresponding to the corrupted frame to identify a relative time of a playback position. For example, the media guidance application may identify the relative time by taking the time corresponding to the corrupted frame and subtracting the total time comprising commercials up to the time of the frame (e.g., based on metadata or any other commercial detection algorithm). For example, the media guidance application may determine that a version of the media asset with commercials is 120 minutes long but a version of the media asset with commercials is 100 minutes long. The media guidance application may identify the portions having commercials to calculate a relative time position synchronized to both media assets.

In some embodiments, the media guidance application may search a database listing a plurality of remote devices accessing remote versions of the media asset to identify a remote device accessing a remote version of the media asset at the playback position. For example, the media guidance application may access a database storing a location of each version of the media asset known to the database. For example, the media guidance application may access a database comprising a listing of remote devices that have recorded the media asset and are playing back the media asset and/or remote devices accessing a channel broadcasting the media asset at the playback position. The media guidance application may, for example, transmit a query to the database identifying the media asset and the playback position. The media guidance application may receive, from the database, a response to the query comprising a listing of remote devices accessing the media asset at the playback position. In an example, the remote device and the local device may share a LAN; or, in another example, the remote device and the local device may be separated by a WAN. The media guidance application may automatically determine an appropriate communication channel and format to communicate with the remote device to receive frames of the remote version.

In some embodiments, the media guidance application may access a database listing a plurality of providers such as an on-demand channel, download provider, video rental service, etc. The media guidance application may be able to request the media asset from the provider and may be able to request that the media asset begins playback at the playback position to, for example, request a place-shifted frame of the remote version at the playback position.

In some embodiments, the media guidance application may need to pay a fee to access a remote version of the media asset. For example, the media guidance application may need to pay a rental charge to access a video-on-demand version of the media asset. In some embodiments, the media guidance application may receive a discount from a remote device requiring payment. For example, the media guidance application may receive a 20% discount if the media guidance application only requests 80% of the media asset. (e.g., receives only corrupted portions of the media asset as described above).

In some embodiments, in response to identifying the remote device, the media guidance application may place-shift a frame of the remote version corresponding to the playback position from the remote device to the local device. For example, the media guidance application may request from the remote device a stream of frames of the second version of the media asset from the remote device to the local device. For example, the media guidance application may query the remote device to re-encode the second version into a format for streaming frames of the second version to the local device in real time (i.e., as a frame is played back at the remote device, it is streamed to the media guidance application).

In some embodiments, the media guidance application may negotiate a place-shifting configuration with the remote device. For example, the media guidance application may negotiate encoding parameters between the media guidance application and the remote device to maximize a quality of a stream based on the capabilities of both devices. For example, the media guidance application may transmit a query (e.g., to a database listing the capabilities of the remote device or to the remote device) to request a format of the remote version and/or encoding capabilities of the remote device. For example, in response to the query transmitted by the media guidance application, the media guidance application may receive a response (e.g., from the database or from the remote device) containing a list of formats the remote device can encode (e.g., VP9, Dirac, H.264, VC-1 etc.) and a file format or encoding format of the remote version of the media asset (e.g., MPEG, H.262, WebM, MKV etc.).

In some embodiments, the media guidance application may retrieve a decoding capability of the local device. For example, the media guidance application may retrieve an decoding capability, such as a listing of video formats that the media guidance application may decode, from a memory of the media guidance application.

In some embodiments, the media guidance application may compare the encoding capability of the remote device to the decoding capability of the local device to identify a mutually compatible encoding format. For example, the media guidance application may compare an encoding capability of the remote device, such as a capability to encode video using H.262 or MPEG-4 format to a decoding capability of the local device, such as an ability of the local device to decode H.262 and MPEG-4 encoded video. The media guidance application may determine a mutually compatible encoding format by determining whether the local device can decode media encoded in a format by the remote device. For example, the media guidance application may determine that the local device is only be able to decode video from the remote device if it is encoded in MPEG-4 format.

In some embodiments, the media guidance application may determine (e.g., based on the format of the remote version and/or the capabilities of the remote device) an encoding format for the place-shifted version of the frame. For example, the media guidance application may determine that the remote version of the media asset is encoded in MPEG-4 format at the remote device. The media guidance application may determine that the local device is capable of decoding media in MPEG-4 format and may transmit a request to the remote device to place-shift a frame of the remote version in MPEG-4 format to the local device.

In some embodiments, the media guidance application may receive the frame of the remote version in a first format at the local device, wherein the remote version was re-encoded, at the remote device, from a second format for streaming over a network connection between the local device and the remote device. For example, the media guidance application may receive a place-shifted frame, such that the place-shifted frame was created at the second device by encoding the remote version to a format capable of streaming to the local device. For example, the remote version may be encoded in H.264 format, but the local device may not be capable of decoding frames encoded in H.264 format. The media guidance application may request a place-shifted frame of the remote version in a format that is compatible with the local device, such as MPEG-4, as described above.

In some embodiments, the media guidance application may request a different format than the format that the remote version was originally encoded in for greater compatibility or to increase performance of the system. For example, the media guidance application may transmit a query (e.g., to a database listing details about a format of the remote media asset or to the remote device) requesting parameters about the video encoding. For example, the media guidance application may receive a packet (e.g., from the database and/or from the remote device) listing video format details of the remote version (e.g., a video resolution, an audio or video bitrate, a number of audio channels, etc.). In an example, the media guidance application may request a video resolution of the remote version to determine if the frame needs to be re-encoded to a resolution of the media guidance application. For example, the media guidance application may determine (e.g., by transmitting the query as described above) that the remote version of the media asset is encoded in 4K resolution. The media guidance application may determine that a display accessible to the media guidance application has a 1080p resolution (i.e., a resolution less than 4 k)_by querying the display for the display capabilities. The media guidance application may request, from the remote device, a frame of the remote version re-encoded to a resolution of 1080p so that it is compatible with the display. The media guidance application may receive a place-shifted frame wherein the frame was re-encoded to at least one of a lower frame rate or lower resolution than a respective frame rate or respective resolution of the local version. For example, the media guidance application may receive a place-shifted frame with a resolution of 720p, which was re-encoded at the remote device from a frame with a resolution of 4 k, in response to the request from the media guidance application. For example, the media guidance application may try to conserve bandwidth (e.g., because the media guidance application may be connected to a metered network connection and may minimize network usage to minimize a network usage cost to the user) by requesting a downsampled frame (e.g., because a frame of a lower resolution comprises less data than a frame of a higher resolution (720p v. 1080p)). The media guidance application may receive frames encoded in a lower resolution or frame rate than the remote version to increase speed (e.g., because a frame of a lower resolution comprises less data than a frame of a higher resolution and resultantly may be quicker to retrieve over a network connection than the frame of higher resolution).

In some embodiments, the media guidance application may test performance capabilities of a communication network utilized by the media guidance application to communicate with the remote device. For example, the media guidance application may conduct a network test (e.g., a network ping test to test latency or a download/upload test to test throughput) between the remote device and the media guidance application. The media guidance application may use the results of the test to determine an encoding parameter for the place-shifted frame. For example, the media guidance application may determine that maximum upload throughput of the remote device is 15 Mbps and that the maximum download throughput of the media guidance application is 20 Mbps. The media guidance application may use the performance capabilities of the network to modify the encoding of the place-shifted frame for transmission over the network.

In some embodiments, the media guidance application may identify an encoding parameter based on the performance capabilities. For example, the media guidance application may determine a frame rate, resolution, encoding format, etc. for the place-shifted frame such that a bandwidth requirement for transmitting the place-shifted frame from the remote device to the local device does not exceed the measured upload throughput of the remote device (15 Mbps).

In some embodiments, the media guidance application may place-shift from the remote device to the local device, a frame of the remote version encoded in the encoding format based on the encoding parameter. For example, the media guidance application may transmit a query to the remote device to request a place-shifted frame in the encoding format (e.g., MPEG-4) based on the encoding parameter (e.g., bandwidth less than 15 Mbps and/or resolution of 1080p).

In some embodiments, the media guidance application may generate for display at the local device the place-shifted frame. For example, the media guidance application may determine that a frame is corrupted and may request a place-shifted version of the frame from a remote device (as described above). The media guidance application may generate for display the place-shifted frame instead of the corrupted frame.

In some embodiments, the media guidance application may receive a current playback position of the remote version, wherein the current playback position corresponds to a progress of the remote version at the remote device. For example, the media guidance application may receive a playback position corresponding to a remote version playing back at a remote device after querying a remote device for a playback position of the remote version (e.g., to determine if the second version is at a playback position equal to the playback position). If the position is equal, the media guidance application may request a place-shifted frame of the version. Or, if the position is different, the media guidance application may request that the remote device commence playback at the playback position.

In some embodiments, in response to determining that the current playback position is not equal to the playback position, the media guidance application instructs the remote device to play the remote version from the playback position. For example, the media guidance application may determine that the playback position of the remote version is not equal to the playback position (e.g., the playback position of the remote version is 45 minutes but the playback position of the local version is five minutes). The media guidance application may send an instruction to the remote device instructing the device to commence playback at the playback position. For example, the media guidance application may instruct the remote device to commence playback at five minutes so that a frame can be place-shifted from the remote version at the playback position.

In some embodiments, the media guidance application may determine, in response to searching the database, that no remote devices are accessing remote versions of the media asset. For example, the media guidance application may query the database as described above. The media guidance application may receive a NULL value from the database, indicating that no remote devices are accessing remote versions of the media asset.

In some embodiments, in response to determining that no remote devices are accessing the remote versions of the media asset, the media guidance application may instruct one of the remote devices to begin playback of the remote version at the playback position. For example, the media guidance application may query a database for a listing of remote devices with access to a second version of the media asset. The media guidance application may receive a list of remote devices and may generate a query to a remote device of the remote devices to commence playback of the media asset at the playback position (e.g., so that the media guidance application may request a place-shifted remote version of the media asset at the playback position). For example, the remote device may have access to the remote version at the playback position on a broadcast channel accessible to the remote device. The media guidance application may instruct the remote device to tune to the channel broadcasting the version. In another example, the media guidance application may identify a remote device having access to a video-on-demand version of the media asset. For example, the media guidance application may transmit a query to the remote device to order the video-on-demand version of the media asset. In another example, the media guidance application may request access to a remote version of the media asset that is stored at a remote device (e.g., a recording or a download of a version of the media asset). The media guidance application may transmit a query to the remote device to request playback of the remote version at the playback position. For example, the media guidance application may instruct the remote device to perform a fast-access playback operation such as a fast-forward operation to locate the playback position. For example, the media guidance application may instruct the remote device to fast-forward to a time in the remote version corresponding to the playback position.

As referred to herein, the phrase "fast-access playback operations" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

In some embodiments, in response to determining that no remote devices are accessing the remote versions of the media asset, the media guidance application may request a portion of a file corresponding to a corrupted frame. For example, the media guidance application may download from a remote device a portion of the media asset, such as data corresponding directly to the video file of the version. In some embodiments, the media guidance application may determine that the remote version is equivalent to the local version. The media guidance application may download portions of the remote version from the remote device and may use the downloaded portions to repair the local file. For example, the media guidance application may identify a portion of the local file that is corrupted, such as the frame, and may replace the frame with a corresponding frame from the remote device.

In some embodiments, the remote version of the media asset may differ from the local version of the media asset by at least one of a media format, resolution, aspect ratio, and total media content. For example, the media guidance application may determine that the second version is a video-on-demand version that does not have any commercials; however, the media guidance application may determine that the local media asset is a recording from a television broadcast that contains commercials. The media guidance application may need to perform further analysis on the second version to identify the playback position (i.e., the version with commercials may be longer in length and may therefore have different content at different playback positions). For example, the media guidance application may detect the portions of local version that contain commercials and may logically remove those portions from the calculation of the playback position (e.g., time for the commercials does not count towards time for the playback position).

In some embodiments, the media guidance application may determine that a corrupted frame is an undesirable portion of the local version and may skip the corrupted frame. For example, the media guidance application may determine that the frame corresponds to a commercial. The media guidance application may detect a user setting to skip all commercials and may as a result skip the corrupted portion of the commercial.

In some embodiments, the media guidance application may perform image processing on the second version to identify whether the playback position is equal to the playback position of the second version. For example, the media guidance application may retrieve a first non-corrupt frame preceding the corrupted frame to compare against the second version to determine if the playback positions are equal. For example, the media guidance application may perform a pixel-by-pixel image comparison to determine if the first non-corrupt frame is equal to a current frame of the second version. If the comparison is equal by a threshold amount (for example, a preconfigured threshold number of pixels that need to be matching), then the playback positions are determined to be equal (e.g., because the images of the frame are equal).

In some embodiments, the media guidance application may store a plurality of frames corresponding to the local version in a buffer of the local device, as described above, and may enumerate a number of frames stored in the buffer that are corrupt. For example, the media guidance application may perform a checksum comparison, as described above, for all frames in the buffer to determine whether frames in the buffer are corrupt. The media guidance application may enumerate the corrupt frames to determine a number of corrupt frames in the buffer.

In some embodiments, the media guidance application may determine that a threshold number of frames are corrupt. For example, the media guidance application may access a threshold value representing a maximum percentage of corrupted frames that may be in the buffer at a given time. The maximum percentage may be user defined (e.g., input via an input device accessible to the media guidance application) or may be preconfigured and stored in a local memory. The media guidance application may replace the frames of the buffer with place-shifted frames from a remote version if the number of corrupt frames exceeds the threshold.

In some embodiments, the media guidance application may identify a current playback position of the local version in response to determining that a threshold number of frames are corrupt. For example, the media guidance application may identify a current playback position as described above to determine whether a second version of the media asset is available at the playback position.

In some embodiments, the media guidance application may place-shift, from the remote device to the local device, all frames of the remote version corresponding to the frames in the buffer. For example, the media guidance application may replace all of the frames in the buffer with place-shifted versions of the frames. For example, the media guidance application may request a place-shifted frame corresponding to the playback position and may store the frame in the buffer by replacing a corresponding frame of the local version with the place-shifted frame. The media guidance application may continue this process until each frame of the local media asset in the buffer is replaced by a corresponding place-shifted version of the frame.

In some embodiments, the media guidance application may generate for display the place-shifted frames in the buffer. For example, the media guidance application may generate for display all the frames in the buffer in sequence (e.g., a playback sequence defined by the second version) once all frames corresponding to the local version have been replaced with frames corresponding to the remote version to provide a smoother playback of the media asset.

Figure 2:
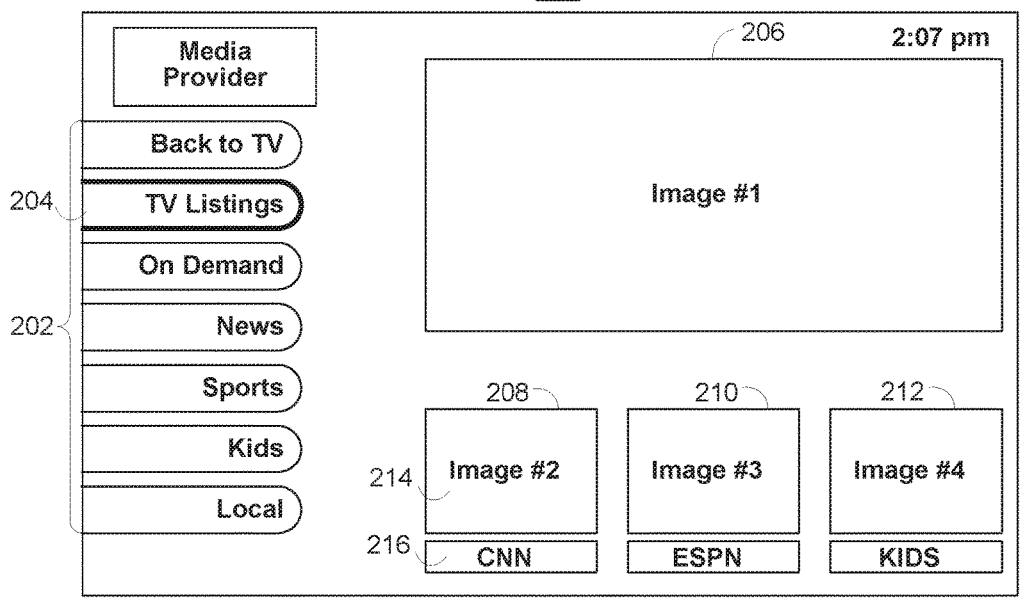
FIG. 2 shows another illustrative example of a media guidance display that may be presented in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
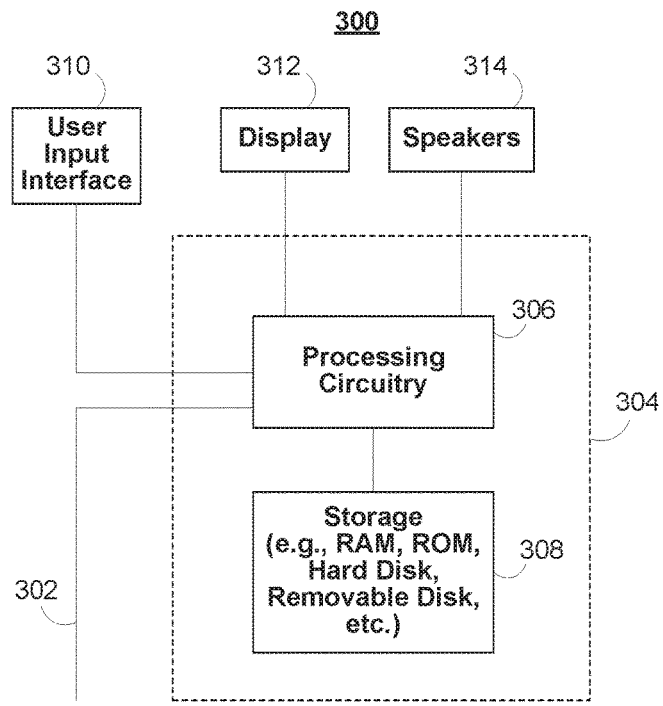
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scalar circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
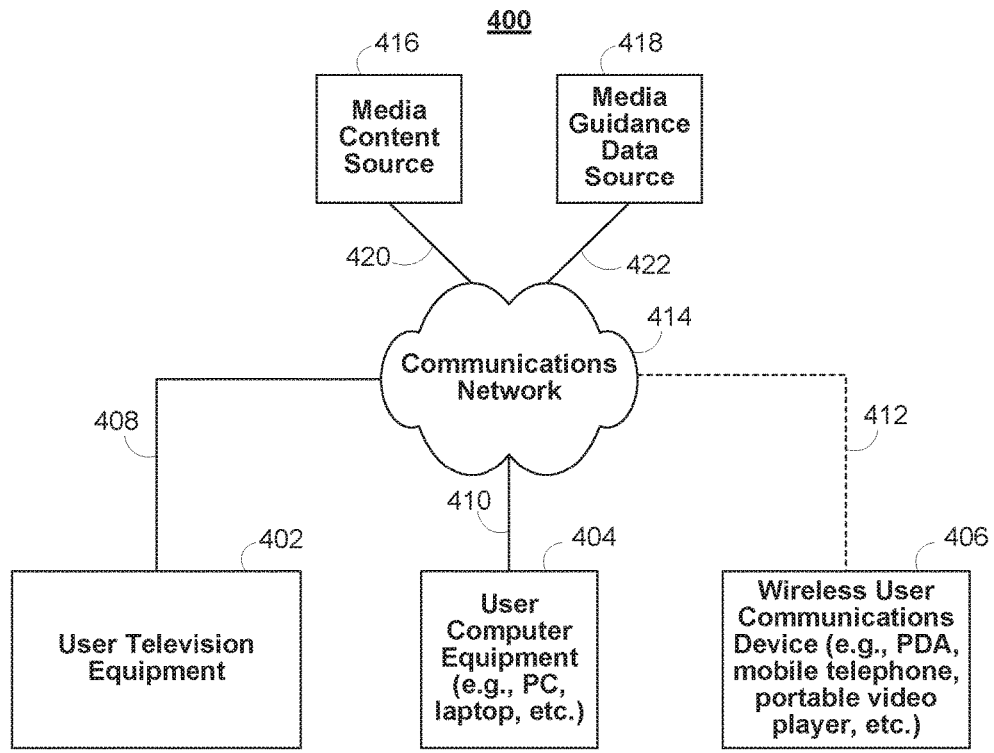
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
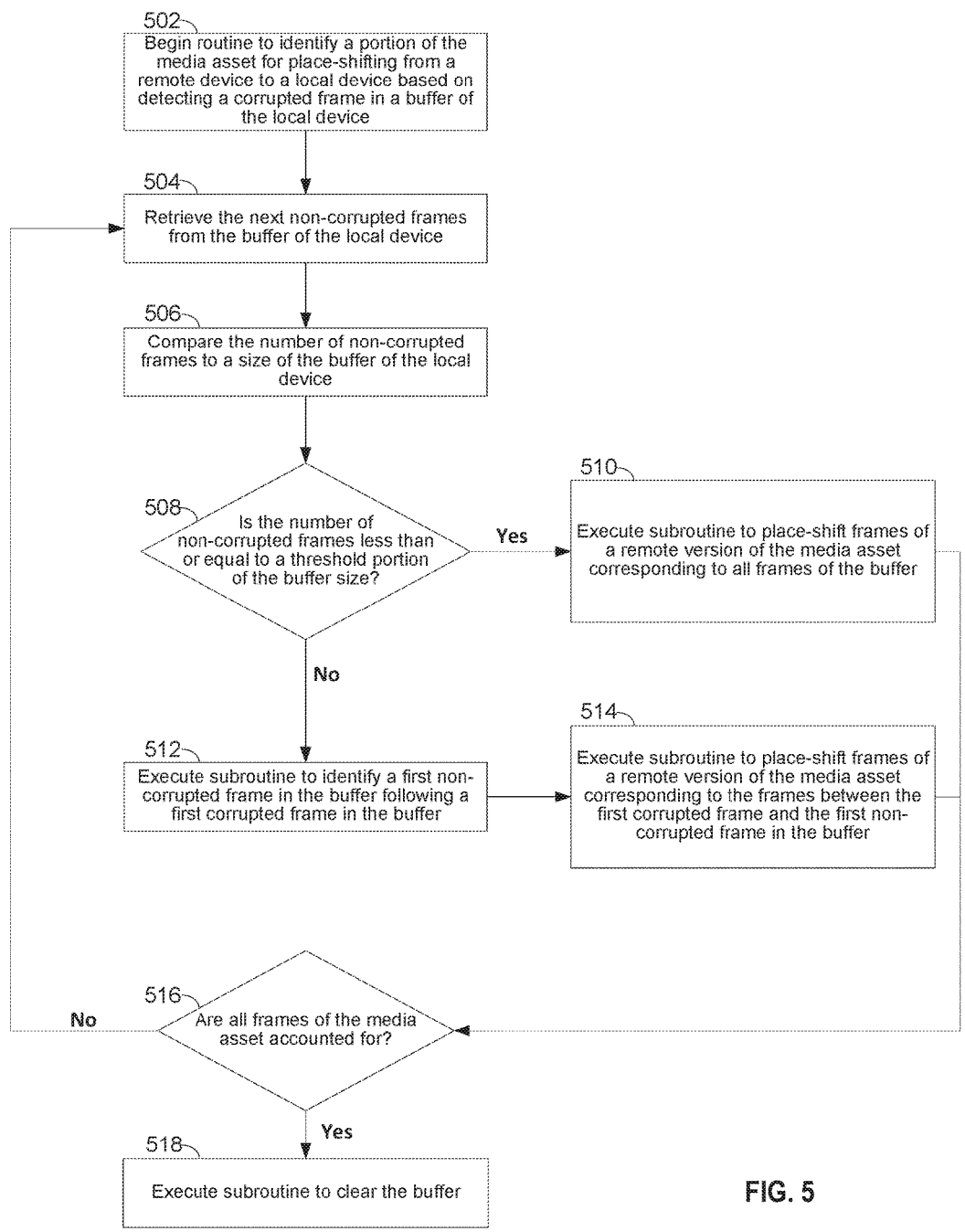
FIG. 5 is a flowchart of illustrative steps for identifying a portion of a media asset for place-shifting in accordance with some embodiments of the disclosure.

FIG. 5 presents a process by a media guidance application (e.g., implemented on control circuitry 304) to identify a portion of the media asset for place-shifting in accordance with some embodiments of the disclosure. In some embodiments this process may be encoded on to a non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

At step 502, control circuitry 304 (e.g., as instructed by a media guidance application) identifies a portion of the media asset for place-shifting by detecting a corrupted frame in the buffer of the local device. In some embodiments, the media guidance application may perform this function either directly or indirectly in response to a user action or input (e.g., from signals received by control circuitry 304 or user input interface 310). For example, process 500 may begin in response to control circuitry 304 receiving signals from user input interface 310 after prompting the user whether they want to view a place-shifted version of the media asset or proceed with watching a corrupted version. Control circuitry 304 may confirm their input using a display (e.g., by generating a prompt to be displayed on display 312) prior to beginning process 500. For example, control circuitry 304 may detect a corrupt frame in a buffer of the local device and may prompt the user (e.g., by displaying a message on a display 312) as to whether the user wants to place-shift a version of the corrupted frame. Control circuitry 304 may receive user input via user input interface 310 in response to the prompt.

At step 504, control circuitry 304 retrieves the next non-corrupted frames from the buffer of the local device. In some embodiments control circuitry 304 may receive an array or list comprising the non-corrupted frames or may receive an array or list comprising pointers to locations that the non-corrupted frames are stored in the buffer. In some embodiments the value may be stored as part of a larger data structure, and control circuitry 304 may retrieve the value by executing appropriate accessor methods to retrieve the value from the larger data structure.

At step 506, control circuitry 304 compares the number of non-corrupted frames to a size of the buffer of the local device. In some embodiments, the value of size of the buffer may be stored (e.g., on storage device 308) prior to beginning process 500. In some embodiments the value of the size of the buffer may also be retrieved for each and every group of non-corrupted frames, and the value of the size of the buffer may change from iteration to iteration. In some embodiments, control circuitry 304 may directly compare the size of the buffer with the value of the number of non-corrupted frames by accessing the values respectively from memory and performing a value comparison. In some instances, control circuitry 304 may call a comparison function (e.g., for object-to-object comparison) to compare the size of the buffer to the number of non-corrupted frames in the buffer.

At step 508, control circuitry 304 compares the number of non-corrupted frames in the buffer and the size of the buffer to determine if the number of non-corrupted frames in the buffer is less than or equal to a threshold portion of the buffer size. For example, control circuitry 304 may retrieve a threshold portion of the buffer size from a memory of the local device (e.g., storage 308). If the condition is satisfied, control circuitry 304 proceeds to step 510; if the condition is not satisfied, the control circuitry 304 proceeds to step 512 instead.

At step 510, control circuitry 304 executes a subroutine to place-shift frames of a remote version of the media asset corresponding to all frames of the buffer based on the condition at step 508 being satisfied. For example, control circuitry 304 may transmit (e.g., over communications network 414) a request to a remote device for place-shifted frames of a remote version corresponding to all frames in the buffer. After the subroutine is executed, control circuitry 304 proceeds to step 516 where it is determined if all frames of the media asset are accounted for to determine if further iterations are needed.

At step 512, control circuitry 304 executes a subroutine to identify a first non-corrupted frame in the buffer following a first corrupted frame in a buffer based on the condition at step 508 not being satisfied. For example, control circuitry 304 may sequentially iterate through all items in the buffer until a non-corrupted frame is identified. In another example, the media guidance application may access an array of non-corrupted frames and may identify a location of the first non-corrupted frame in the buffer (e.g., by retrieving a pointer stored in the array). After the subroutine is executed, the algorithm may proceed to step 514 where a subroutine to place-shift frames of a remote version of the media asset corresponding to the frames between the first corrupted frame and the first non-corrupted frame in the buffer is executed.

At step 514, control circuitry 304 executes a subroutine to place-shift frames of a remote version of the media asset corresponding to the frames between the first corrupted frame and the first non-corrupted frame in the buffer. For example, control circuitry 304 may transmit a query (e.g., over communications network 414) to a remote device having a remote version of the media asset. Control circuitry 304 may include in the query a request for place-shifted frames of the remote version corresponding to frames in the buffer between the first corrupted frame and the first non-corrupted frame. After the subroutine is executed, the algorithm may proceed to step 516 where it is determined if all frames of the media asset are accounted for to determine if further iterations are needed.

At step 516, control circuitry 304 checks if all instances of frames of the media asset are accounted for. If all of the frames have been evaluated, control circuitry 304 may proceed to step 518. For example, control circuitry 304 may call a function to see if there is a next frame of the media asset. If the function returns true (i.e., there are still frames that need to be processed), control circuitry 304 may proceed to step 504.

At step 518, control circuitry 304 executes a subroutine to clear the buffer of any remaining frames. For example, control circuitry 304 may sequentially generate for display on display 312 the remaining frames. Control circuitry 304 may remove a frame from the buffer once it is generated for display.

It is contemplated that the descriptions of FIG. 5 may be used with any other embodiment of this disclosure. In addition, the descriptions described in relation to process 500 may be done in alternative orders or in parallel to further the purposes of this disclosure. For example, conditional statements and logical evaluations, such as those at 508 and 516, may be performed in any order or in parallel or simultaneously to reduce lag or increase the speed of the system or method. As a further example, in some embodiments several frames of the media asset may be evaluated in parallel, using multiple logical processor threads, or process 500 may be enhanced by incorporating branch prediction. Furthermore, it should be noted that process 500 may be implemented on a combination of appropriately configured software and hardware, and that any of the devices or equipment discussed in relation to FIGS. 3-4 and 9 could be used to implement one or more portions of process 500.

The pseudocode in FIG. 6 describes an algorithm to identify a portion of the media asset for place-shifting from a remote device to a local device in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, control circuitry 304 runs a subroutine to initialize variables and prepare to identify frames to be place-shifted from a remote device to a local device, which begins on line 605. For example, in some embodiments control circuitry 304 may copy instructions from a non-transitory storage medium (e.g., storage device 308) into RAM or into the cache for processing circuitry 306 during the initialization stage. Additionally, in some embodiments the value of a size of a buffer being used for comparison, or a tolerance level for determining if two values are essentially equivalent, may be retrieved, set, and stored at 601.

At line 605, control circuitry 304 receives non-corrupted frames stored in a buffer of the local device. Control circuitry 304 may receive the non-corrupted frames by receiving, for example, a pointer to an array or list of frames or may receive an array or list of pointers to locations in the buffer comprising the non-corrupted frames. In another example, control circuitry 304 may receive an object of a class, such as an iterator object containing frame elements. Control circuitry 304 may access elements of the iterator object by calling an appropriate function.

At line 606, control circuitry 304 iterates through the various frames of the media asset; if only a single instance is available, the loop will only execute once. This loop may be implemented in multiple fashions depending on the choice of hardware and software language used to implement the algorithm of FIG. 6; for example, this may be implemented as part of a "for" or "while" loop.

At line 607, control circuitry 304 stores an array of non-corrupted frames from the buffer into a temporary variable "A." In some embodiments the array will be stored as part of a larger data structure or class, and the array may be obtained through appropriate accessor methods. In some embodiments, control circuitry 304 may call a function to perform a comparison of a number of elements of the array of non-corrupted frames to a threshold minimum number of non-corrupted frames of the buffer.

At line 608, control circuitry 304 stores the value of the threshold minimum value of buffer frames that are non-corrupted into a temporary variable "B." Similar to the array of non-corrupted frames, in some embodiments the threshold minimum percentage of buffer frames will be stored as part of a larger data structure or class, and the value of the threshold minimum percentage of buffer frames may be obtained through accessor methods. The threshold minimum percentage of buffer frames that are non-corrupted may be a primitive data structure, and may be directly used in the comparisons at lines 609 and 611.

At line 609, control circuitry 304 compares the number of elements in array A divided by the total buffer size (i.e., a total number of frames that can be stored in the buffer) to the value of B to see if the number of elements in A divided by the buffer size is less than or equal to the threshold minimum percentage of non-corrupted frames. In some embodiments the threshold level of B may be a fixed number instead of a set percentage. As an example, control circuitry 304 would not divide the total number of elements in A by the total buffer size for the comparison when B is a fixed number. In another example, setting the threshold level of B to a set multiple of machine epsilon may allow for the algorithm to account for small rounding errors that may result from the use of floating point arithmetic. In some embodiments the tolerance level may be set to zero, or the condition inside the "IF" statement may be replaced with a strict equivalence between A and B. One of ordinary skill in the art will realize that this is just a single exemplary embodiment of a comparison between the threshold value and the number of elements in A and that other methods for comparison are possible. For example, the threshold minimum value of B may be changed to a threshold maximum value. In this instance, control circuitry 304 may determine if a total length of A is greater than the threshold maximum value B.

At line 610, control circuitry 304 executes a subroutine to place-shift frames of a remote version of the media asset corresponding to all frames of the buffer using control circuitry if the condition in line 609 is satisfied. For example, control circuitry 304 may replace all frames of the buffer with place-shifted frames corresponding to a remote version of the media asset. In some embodiments, this may be achieved by processing circuitry 306 sending the appropriate signals to a remote device via communications network 414 to request place-shifted versions of the frames. Control circuitry 304 may receive the place-shifted frames via communications network 414 and may store the place-shifted frames in storage 308, such as in a buffer in storage 308.

At line 611, control circuitry 304 determines whether the condition in line 609 was not satisfied. If the condition was not satisfied, control circuitry may evaluate and execute the instruction at line 612.

At line 612, control circuitry 304 executes a subroutine to identify a first non-corrupted frame in the buffer following a first corrupted frame in the buffer using control circuitry if the condition in line 611 is satisfied. For example, control circuitry 304 may access a first element in the array of non-corrupted frames to identify a first non-corrupted frame.

At line 613, control circuitry 304 executes a subroutine to place-shift frames of a remote version of the media asset corresponding to the frames between the first corrupted frame and the first non-corrupted frame in the buffer using control circuitry 304. Control circuitry 304 may correlate the first non-corrupted frame (identified above) to a position in the buffer. Control circuitry 304 may request place-shifted frames of a remote version of the media asset from a remote device by transmitting a query to the remote device via communications network 414. Control circuitry 304 may request in the query only place-shifted versions of the frames corresponding to the frames between the corrupted frame and the first non-corrupted frame. For example, control circuitry 304 may only need to replace corrupted frames in the buffer and may leave the non-corrupted frames in the buffer (i.e., without replacement).

At line 614, control circuitry 304 executes a subroutine to clear the buffer. For example, control circuitry 304 may run a routine to generate for display a frame on display 312. Control circuitry 304 may remove a frame from the buffer after it is generated for display on display 312.

At line 616, control circuitry 304 runs a termination subroutine after the algorithm has performed its function. For example, in some embodiments control circuitry 304 may destruct variables, perform garbage collection, free memory or clear the cache of processing circuitry 306.

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments a break condition may be placed after line 610 to speed operation, or the conditional statements may be replaced with a case-switch. In some embodiments, rather than iterating over all frames of the media asset at step 506, in some embodiments the code may be rewritten so control circuitry 304 is instructed to evaluate multiple frames of the media asset simultaneously on a plurality of processors or processor threads, lowering the number of iterations needed and potentially speeding up computation time.

Figure 7:
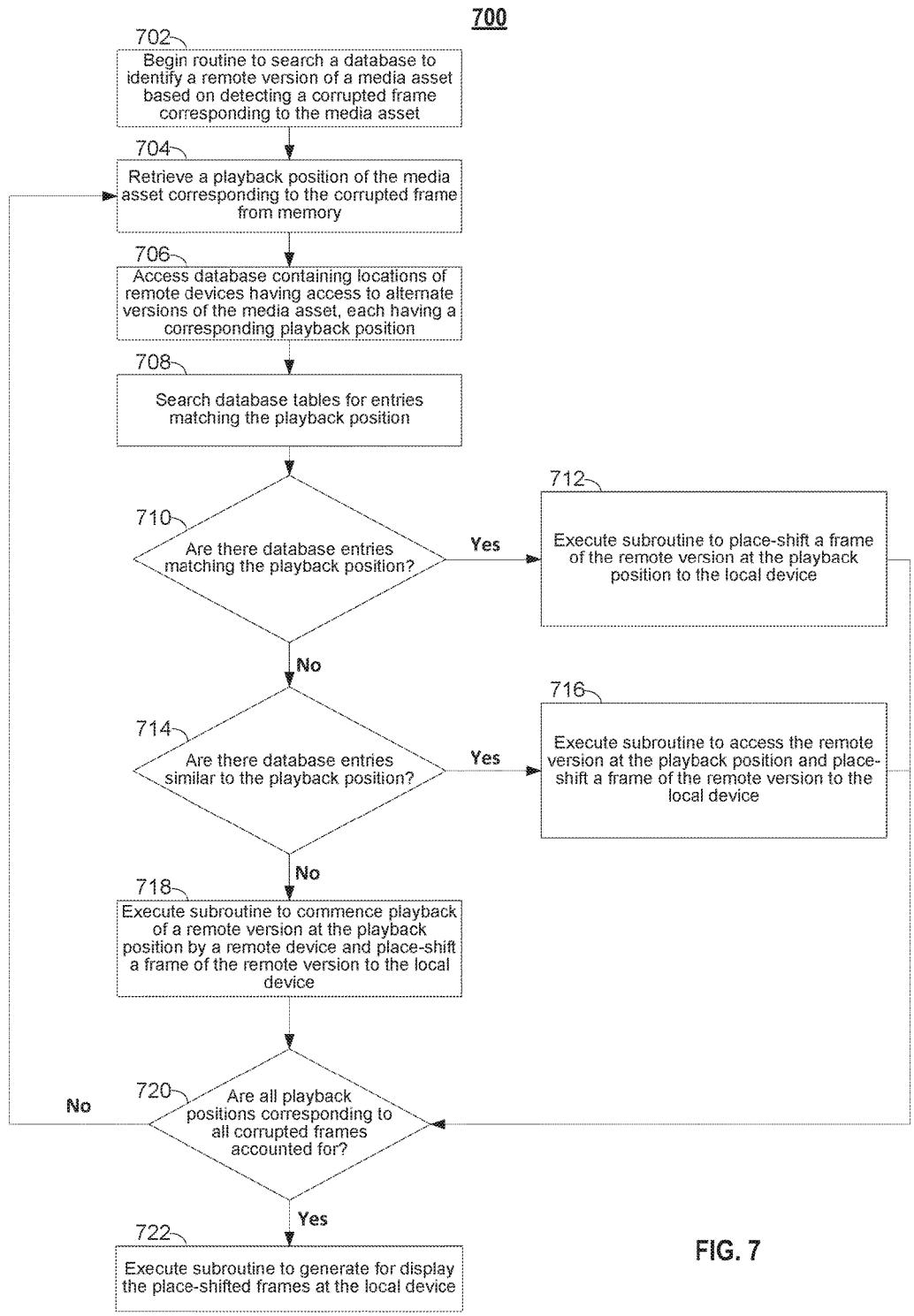
FIG. 7 is a flowchart of illustrative steps for searching a database to identify a remote version of a media asset in accordance with some embodiments of the disclosure.

FIGS. 7 and 8 present a process for control circuitry (e.g., control circuitry 304) to search a database to identify a remote version of a media asset based on detecting a corrupted frame corresponding to the media asset using a database containing locations of remote devices having access to alternate versions of the media asset in accordance with some embodiments of the disclosure. Similar to the processes described by FIGS. 5 and 6, in some embodiments the process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes a process for control circuitry (e.g., control circuitry 304) to search a database and identify a remote version of a media asset based on detecting a corrupted frame corresponding to the media asset in accordance with some embodiments of the disclosure.

At step 702, control circuitry 304 searches a database and identifies a remote version of the media asset will begin if control circuitry 304 detects a corrupted frame in the buffer of the local device (e.g., in storage 308). In some embodiments, this may be done either directly or indirectly in response to a user action or input (e.g., from signals received by control circuitry 304 or user input interface 310).

At step 704, control circuitry 304 retrieves the next instance of a playback position corresponding to a corrupted frame from memory. In some embodiments control circuitry 304 may retrieve a single primitive data structure that represents the value of the playback position. In some embodiments control circuitry 304 may retrieve the value from a larger class or data structure.

At step 706, control circuitry 304 accesses a database containing locations of remote devices having access to alternative versions of the media asset each having a corresponding playback position. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., media guidance data source 418).

At step 708, control circuitry 304 searches database tables for entries matching the playback position. In some embodiments this may be done by comparing an identifier, for example, a string or integer representing the playback position, that matches the types of identifiers used inside the database. In some embodiments control circuitry 304 may submit a general query to the database for table entries matching the media asset, and control circuitry 304 may receive a list of indices or a data structure containing a portion of the database contents. For example, control circuitry 304 may query the database for a listing of all remote device locations having access to a second version of the media asset. Control circuitry 304 may receive a table comprising a listing of all the entries regardless of a playback position of the media asset. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

At step 710, control circuitry 304 determines if there are database entries matching the playback position. In some embodiments control circuitry 304 may receive a signal from the database indicating that there are no matching entries. In some embodiments control circuitry 304 may instead receive a list of indices or data structures with a NULL or dummy value. If control circuitry 304 identifies that there are database entries matching the playback position the algorithm proceeds to step 712; otherwise the algorithm proceeds to step 714.

At step 712, control circuitry 304 executes a subroutine to place-shift a frame of the remote version from the remote device to the local device at the playback position. For example, control circuitry 304 may request from the remote device a place-shifted version of a frame of the media asset by transmitting a query to the remote device via communications network 414. Afterwards, the algorithm may proceed to step 720 where it is determined if there are further playback positions corresponding to corrupted frames that need to be accounted for.

At step 714, control circuitry 304 determines if there are database entries similar to the playback position. For example, control circuitry 304 may search the database for a second version of the media asset that may be at a playback position similar to the playback position. For example, control circuitry 304 may search the database for versions of the media asset that are at a playback position within five seconds of the playback position. For example, in some embodiments, if the playback position is encoded as a string with multiple characters (e.g., to represent a chapter name of a media asset), control circuitry 304 may perform additional database queries for similar strings with individual characters replaced, removed or added. In some embodiments control circuitry 304 may also determine if the original query was a commonly misspelled word, and will submit a query with the correct spelling instead. In another example, the playback position may be encoded as an integer; control circuitry 304 may perform additional queries for other integers within a certain range. In some embodiments control circuitry 304 may retrieve database entries of second media assets at playback positions similar to a playback position of the media asset without requiring further queries. If control circuitry 304 identifies that there are database entries at a playback position similar to the playback position the algorithm proceeds to step 716; otherwise the algorithm proceeds to step 718.

At step 716, control circuitry 304 executes a subroutine to access the remote version at the playback position and place-shift a frame of the remote version to the local device. For example, control circuitry 304 may send an instruction to the remote device to access the remote version at the playback position (e.g., by fast-forwarding to the playback position). In another example, control circuitry 304 may delay requesting to place-shift the frames until the remote version is at the playback position. For example, control circuitry 304 may determine that the remote version is five seconds behind the playback position. Control circuitry 304 may delay requesting the place-shifted frames of the remote version for five seconds (i.e., so that the place-shifted frame corresponds to the playback position). Afterwards, the algorithm may proceed to step 720.

At step 718, control circuitry 304 executes a subroutine to commence playback of a remote version at the playback position by a remote device and place-shift a frame of the remote version to the local device after determining that there were no matching or similar database entries for the playback position. For example, control circuitry 304 may transmit a query to a remote device having access to an alternate version of the media asset. Control circuitry 304 may instruct the remote device to commence playback of the alternate version at the playback position and may request a place-shifted version of a frame of the alternate version corresponding to the playback position. Afterwards, the algorithm may proceed to step 720.

At step 720, control circuitry 304 determines if all playback positions corresponding to other corrupted frames are accounted for and if further iterations are needed. If further iterations are needed the algorithm will loop back to step 704 where control circuitry 304 will retrieve the next playback position. If no further iterations are needed the algorithm will proceed to step 722.

At step 722, control circuitry 304 executes a subroutine to generate for display the place-shifted frames at the local device. For example, control circuitry 304 may generate for display a place-shifted frame for display on display 312.

It is contemplated that the descriptions of FIG. 7 may be used with any other embodiment of this disclosure. In addition, the descriptions described in relation to the process of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the process. As a further example, although step 712 and step 716 are described as being mutually exclusive, both exact entries and similar entries may be processed for a single playback position. As another example, multiple instances of process 700 may be executed in parallel or sequentially. For example, control circuitry 304 may detect multiple corrupted frames corresponding to the local media asset and may execute multiple instances of process 700 to retrieve a place-shifted version of a remote frame corresponding to each corrupted frame. For example, control circuitry 304 may execute a first instance of process 700 to retrieve a place-shifted version of a first frame of a first remote version (e.g., from a first remote device) corresponding to a first corrupted frame (e.g., a first corrupted frame of the local media asset); and control circuitry 304 may execute a second instance of process 700 to retrieve a place-shifted version of a second frame (e.g., from a second remote device) corresponding to a second corrupted frame (e.g., a second corrupted frame of the local media asset). To further this purpose, in some embodiments step 710 and step 714 may be performed in parallel by control circuitry 304. Furthermore, it should be noted that the process of FIG. 7 may be implemented on a combination of appropriately configured software and hardware, and that any of the devices or equipment discussed in relation to FIGS. 3-4 and 5 could be used to implement one or more portions of the process.

The pseudocode in FIG. 8 describes an algorithm to search a database to identify a remote version of the media asset in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 304 runs a subroutine to initialize variables and prepare to identify a remote version of the media asset, which begins on line 805. For example, in some embodiments control circuitry 304 may copy instructions from a non-transitory storage medium (e.g., storage device 308) into RAM or into the cache for processing circuitry 306 during the initialization stage.

At line 805, control circuitry 304 receives instances of a playback position of the media asset corresponding to a corrupted frame of the media asset. In some embodiments these instances may be retrieved from memory.

At line 806, control circuitry 304 iterates through the various playback positions; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments it may be convenient to store the playback positions in a single class or encapsulated data structure that will perform the loop as part of an internal method.

At line 807, control circuitry 304 queries a database for entries matching the playback position. Depending on how the database is implemented and how the playback position is stored, an intermittent step may be required to convert the playback position into a form consistent with the database. For example, the playback position may be encoded into a string or an integer using an appropriate hashing algorithm prior to being transmitted to the database by control circuitry 304 as part of a query. In another instance, the playback position may correspond to a position in the local version of the media asset, which may be different from a corresponding playback position in other versions of the media asset. Control circuitry 304 may convert the playback position to a corresponding playback position of an alternate version (using the methods described above, for example, for the remote version) before searching the database. In some embodiments the playback position may be encoded as a primitive data structure, and control circuitry 304 may submit the playback position as a query to the database directly. After querying the database, control circuitry 304 may receive a set of database entries (e.g., remote locations accessing the version of the media asset at the playback position). In some embodiments control circuitry 304 may receive these entries in the form of a data-structure, a set of indices of the database, or a set of indices of another cross-referenced database.

At line 808, control circuitry 304 determines if there are any database entries matching the playback position. In some embodiments control circuitry 304 may make a determination by checking if the database returned an empty data structure or a NULL value in response to the query in line 807. If there are matching database entries, the algorithm may proceed to line 809. If there were no matching database entries, the algorithm may instead proceed to line 812.

At line 809, control circuitry 304 retrieves one or more remote locations accessing a remote version at the playback position from the database. For example, if control circuitry 304 retrieves a list of indices after querying the database in line 807, in some embodiments control circuitry 304 may retrieve the database entries for locations of remote devices accessing a version of the media asset at the playback position located at the received indices. In some embodiments the indices may point to a larger data structure contained within the database, and control circuitry 304 may retrieve the locations of remote devices accessing a version of the media asset at the playback position from within the data structure using appropriate accessor methods. In some embodiments control circuitry 304 may retrieve the locations of remote devices accessing a version of the media asset at the playback position and store them in a separate data structure locally (e.g., in storage 308) prior to proceeding further. After retrieving the locations of remote devices accessing a version of the media asset at the playback position, the algorithm will proceed to line 810.

At line 810, control circuitry 304 executes a subroutine to use the locations of remote devices accessing a version of the media asset at the playback position and place-shift a frame of the remote version to using communications network 414. Afterwards, the algorithm may proceed to line 815.

At line 811, control circuitry 304 determines if there are any database entries similar to the playback position. Control circuitry 304 may search the database for remote devices accessing a second version of the media asset at a playback position similar to the playback position. For example, the media guidance application may search for a remote device accessing a second version of the media asset at a playback position that differs from the playback position by less than five seconds. In an example, the playback position may be represented by an object of a class. Control circuitry 304 may call a function to perform a fuzzy comparison (e.g., a comparison to identify similar objects of the class) by comparing specific fields of the class or by performing approximate string matching on data related to the playback position. If database entries having a playback position similar to the playback position are found by control circuitry 304, then the algorithm proceeds to line 812. If control circuitry 304 does not find similar entries (e.g., a query to the database returns a NULL value), the algorithm proceeds to line 813.

At line 812, control circuitry 304 executes a subroutine to use the location of the remote device (e.g., returned from the database) to access the remote version at the playback position and place-shift a frame of the remote version from the remote device to the local device using control circuitry 304. Afterwards, the algorithm may proceed to line 815.

At line 813, control circuitry 304 determines that there were no database entries matching or similar to the playback position. In this case, the algorithm will proceed to line 814.

At line 814, control circuitry 304 executes a subroutine to commence playback of a remote version at the playback position and place-shift a frame of the remote version to the local device using control circuitry 304 if neither of the conditions at lines 808 or 811 are satisfied. For example, control circuitry 304 may send an instruction (e.g., via communications network 414) to the remote device to begin playback of the remote version at the playback position. Control circuitry 304 may request a place-shifted frame of the remote version at the playback position from the remote device. Afterwards, the algorithm may proceed to line 814.

At line 815, control circuitry 304 executes a subroutine to generate for display the place-shifted frames using control circuitry 304. For example, the media guidance application may generate for display the place-shifted frame for display on display 312. Afterwards, the algorithm may proceed to the termination subroutine at line 817.

At line 817, control circuitry 304 executes a termination subroutine after the algorithm has performed its function and all playback positions have been processed and checked against the database. For example, in some embodiments control circuitry 304 may destruct variables, perform garbage collection, free memory or clear the cache of processing circuitry 306.

It will be evident to one skilled in the art that the process described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be rewritten so control circuitry 304 is instructed to evaluate multiple playback positions and submit multiple database queries simultaneously using a plurality of processors or processor threads. It is also understood that, although we may describe control circuitry 304 interacting with a single database, this is only a single embodiment described for illustrative purposes, and the algorithm of FIG. 8. may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on-demand.

Figure 9:
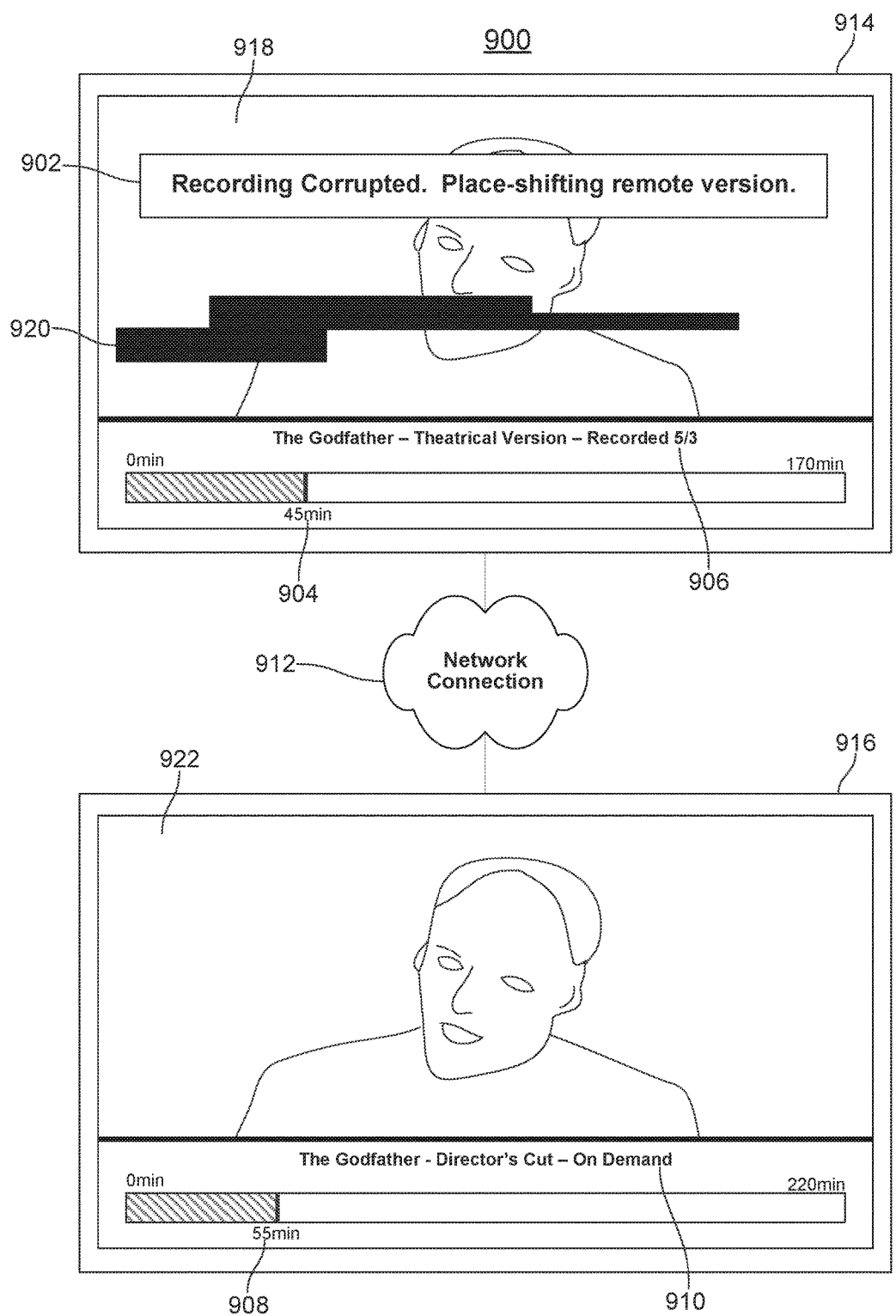
FIG. 9 is an illustrative example of a local user device receiving a place-shifted version of a media asset from a remote device in accordance with some embodiments of the disclosure.

FIG. 9 illustrates an example of a user equipment device running (e.g., via control circuitry 304) a media guidance application for playing back media. In particular, FIG. 9 illustrates user equipment devices 900, such as local device 914 and remote device 916, for playing back media connected via network connection 912. Local device 914 may comprise a display screen, such as display 312, control circuitry, such as control circuitry 304, a user input module, such as user input interface 310, a speaker, such as speakers 314, and media storage, such as storage 308. Local device 914 may use control circuitry 304 to run a media guidance application for playing back media stored on local device 914, such as a media asset stored in storage 308.

Control circuitry 304 may generate for display on local device 914 a frame corresponding to the media asset such as corrupt frame 918 containing corrupt data, such as video corruption 920. Control circuitry 304 may generate for display playback position 904 corresponding to a playback position of the frame. For example, control circuitry 304 may correlate the frame to a playback position in the media as described above and may generate for display a time (e.g., 45 min) corresponding to the playback position as playback position 904. Control circuitry 304 may also generate for display a title and other metadata corresponding to the media asset, such as local metadata 906.

In some embodiments, control circuitry 304 detects that corrupt frame 918 contains corrupt data, such as video corruption 920, and displays a prompt to the user, such as prompt 902, informing the user that control circuitry 304 will place-shift a remote version of the media asset. Control circuitry 304 may be able to communicate with a remote device, such as remote device 916, via a network connection, such as network connection 912. In some embodiments, control circuitry 304 may use network connection 912 to communicate with devices on communications network 414. For example, control circuitry 304 may communicate with a database over communications network 414 as described above to locate a remote version of the media asset at the playback position. Control circuitry 304 may compute a playback position corresponding to the remote version of the media asset, such as remote playback position 908, corresponding to the remote version having remote metadata 910.

In some embodiments, control circuitry 304 transmits a request to remote device 916 to place-shift non-corrupt frame 922 from the remote device to the local device (e.g., to generate for display a non-corrupt frame at the local device). In an embodiment, control circuitry 304 may generate for display (e.g., for display on display 312) a place-shifted frame corresponding to non-corrupt frame 922 at local device 914 once the place-shifted frame is received over network connection 912 from remote device 916.

Figure 10:
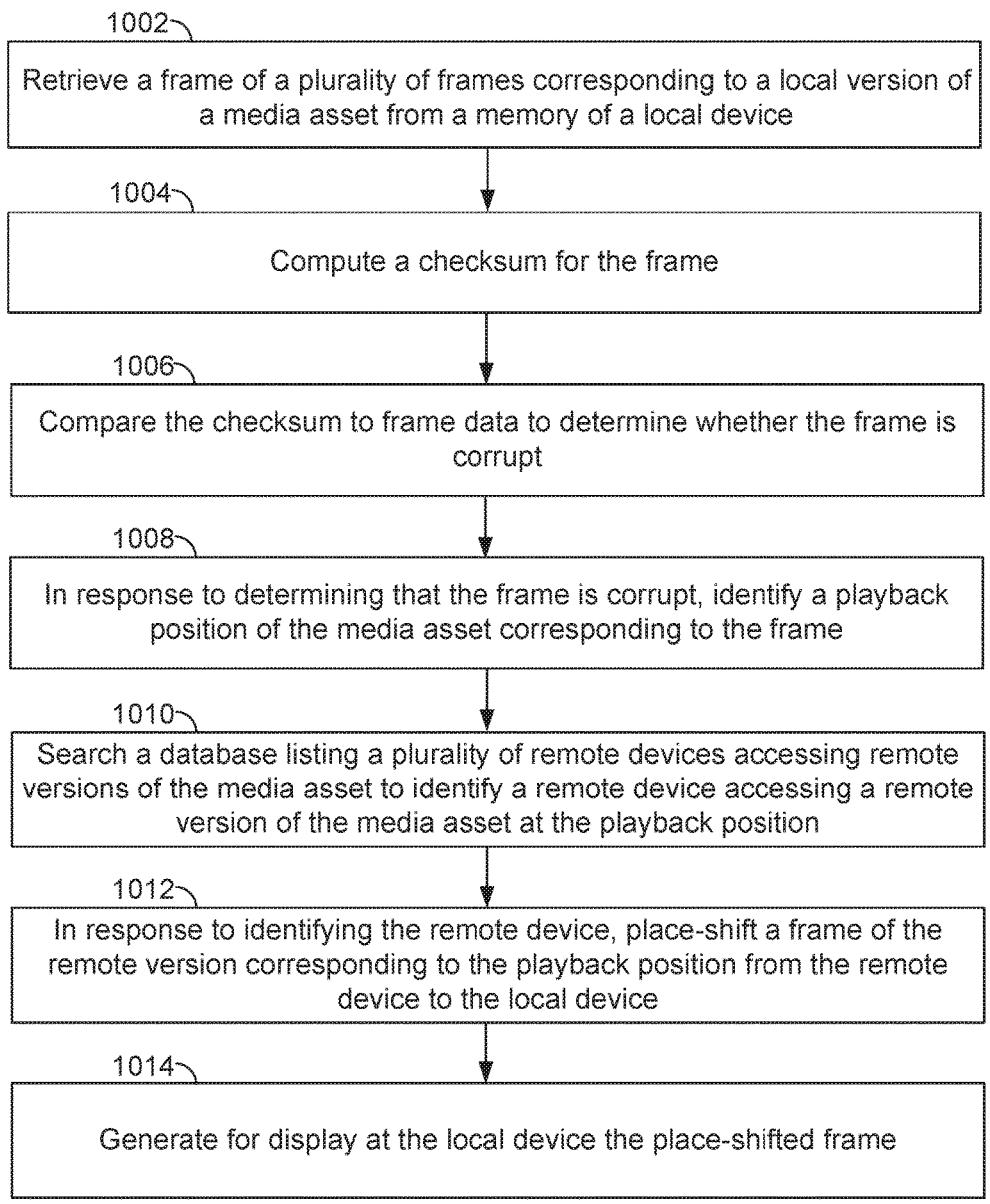
FIG. 10 is a flowchart of illustrative steps for playback of a corrupted recording in accordance with some embodiments of the disclosure.

FIG. 10 depicts a flowchart of illustrative steps for playing back media at a local device, such as local device 914, in accordance with the present disclosure. Particularly FIG. 10 depicts a flowchart for playing back corrupted media at a local device, such as local device 914, by place-shifting non-corrupted frames of a remote version of the local media from a remote device, such as remote device 916, to a local device, such as local device 914. It should be noted that process 1000, or any step thereof, could be performed on, or provided by, any other devices shown in FIGS. 3-4 and 9. For example, process 1000 may be executed by control circuitry 304 as instructed by a media guidance application implemented on user equipment 402, 404, 406, local device 914, or remote device 916 in order to play back media. In addition, one or more steps of process 1000 may be incorporated into or combined with one or more steps of any other process or embodiment (e.g., process 500 and 700).

At step 1002, control circuitry 304 receives a frame of a plurality of frames corresponding to a local version of a media asset from a memory of a local device. For example, control circuitry 304 may access a memory, such as storage 308, comprising a plurality of frames corresponding to a local version of a media asset. Control circuitry 304 may sequentially retrieve frames from memory in a predefined order (e.g., an order defined by the encoding of the media asset) to play back the media asset on display 312.

At step 1004, control circuitry 304 computes a checksum for the frame. For example, control circuitry 304 may enumerate the number of "1" bits in a data portion of a frame (as described above) and may compare the results of the enumeration to a checksum portion of the frame. For example, control circuitry 304 may access a checksum field of the frame and may check for equality against the computed checksum. If the checksums are equal, control circuitry 304 may determine that the frame is not corrupted. Otherwise, control circuitry 304 may determine that the frame is corrupted.

At step 1006, control circuitry compares the checksum to frame data to determine whether the frame is corrupt. As described above, control circuitry 304 may compare the checksum of the frame to the computed checksum to determine whether the frame is corrupt. If control circuitry 304 determines that a frame is corrupt, control circuitry 304 may replace the corrupted frame with a non-corrupt version of the frame.

At step 1008, in response to determining that the frame is corrupt, control circuitry 304 identifies a playback position of the media asset corresponding to the frame. For example, control circuitry 304 may correlate a number representing a position of the frame in a sequence of frames of the media asset to a playback time of the media asset. Control circuitry 304 may use this playback time to locate a remote, non-corrupt version of the corrupt frame.

At step 1010, control circuitry 304 searches a database listing a plurality of remote devices accessing remote versions of the media asset to identify a remote device accessing a remote version of the media asset at the playback position. For example, control circuitry 304 may access a remote or local database (e.g., a database located at media guidance data source 418 via communications network 414 or a database located at storage 308) listing remote devices having access to remote versions of the media asset. The control circuitry 304 may be able to access in the database fields listing a playback position of the remote version corresponding to a remote device. Control circuitry 304 may search the database to identify a remote device, such as remote device 916, accessing a remote version of the media asset at the playback position.

At step 1012, in response to identifying the remote device, control circuitry 304 place-shifts a frame of the remote version corresponding to the playback position from the remote device to the local device. For example, control circuitry 304 may transmit a packet to remote device 916 requesting a place-shifted frame of the second version of the media asset from remote device 916 to local device 914. Control circuitry 304 may store the place-shifted frame in a playback buffer, such as a buffer located in storage 308, instead of the corrupted frame, such that control circuitry 304 may retrieve the place-shifted frame from the playback buffer and may generate for display (e.g., display 312) the place-shifted frame.

At step 1014, control circuitry 304 may generate for display at the local device, such as local device 914, the place-shifted frame. For example, as described above, control circuitry 304 may store the place-shifted version of the frame in a buffer and may retrieve the frame from the buffer to generate for display, on display 312, the frame at the local device (e.g., local device 914).

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiments in a suitable manner, done in different orders, or done in parallel. Furthermore, it should be noted that while a first step may be based on and/or in response to a second step, such a relationship does not preclude additional steps occurring between the first and second steps. In addition, the systems and methods described herein may be performed in real time. It should also be noted, the systems and/or methods described above may be applied to, or used in accordance with, other systems and/or methods.

What is claimed is:

1. A method for playing media, the method comprising:
receiving a user input requesting playback on a local device of a first version of a media asset, wherein the first version of the media asset is selected from a plurality of media assets stored in a memory of the local device;

retrieving, from the memory of the local device, a first frame of a first plurality of frames associated with the media asset;

in response to determining that the first frame is corrupt:
    searching a database that comprises a listing of a plurality of remote devices that store remote versions of the media asset to identify a remote device that stores a second version of the media asset, wherein identifying the remote device comprises:
        determining that the first frame matches a second frame of a second plurality of frames associated with the second version of the media asset; and
        determining that an encoding capability of the remote device matches a decoding capability of the local device; and
    in response to identifying the remote device:
        receiving the second frame that was place-shifted from the remote device to the local device; and
        generating for display at the local device the second frame.

2. The method of claim 1, wherein the remote device is one of a plurality of remote devices storing the second version of the media, and wherein identifying the remote device storing the second version of the media asset is based on a determination that the remote device is accessing the second version of the media asset at the second frame.

3. The method of claim 1, wherein determining that the first frame comprises is corrupt, further comprises:
    computing a checksum for the first frame;
    comparing the computed checksum to a checksum value associated with the frame; and
    determining that the frame is corrupt when the computed checksum differs from the checksum value associated with the frame.

4. The method of claim 1, wherein determining that the first frame matches a second frame of a plurality of frames associated with the second version of the media asset, further comprises:
    identifying a first playback position corresponding to the first frame;
    identifying a second playback position corresponding to the second frame; and
    determining that the first playback position matches the second playback position.

5. The method of claim 4, wherein content in the second version of the media asset differs from content in the media asset, and wherein determining that the first playback position matches the second playback position further comprises:
    identifying content that differs between the media asset and the second version of the media asset; and
    normalizing the first playback position and the second playback position by excluding the content from the normalized first playback position and the normalized second playback position.

6. The method of claim 1, wherein the first version of the media asset is stored in a first format in the memory of the local device, and wherein the second version of the media asset is stored in a second format, different from the first format, in the memory of the remote device.

7. The method of claim 6, further comprising:
    retrieving, from the memory of the local device, a profile for a user of the local device;
    identifying, based on the profile, media display preferences associated with the user;
    determining an encoding parameter based on the media display preferences associated with the user;
    transmitting, to the remote device, the encoding parameter; and
    receiving, from the remote device, the second frame encoded in the first format based on the encoding parameter.

8. The method of claim 7, further comprising:
    identifying a performance capability of a communication channel utilized by the local device for communication with the remote device; and
    modifying the encoding parameter based on the performance capability.

9. The method of claim 6, wherein the second frame is received, by the local device, in a third format, different from the first and the second format.

10. The method of claim 1, further comprising:
    calculating a number of frames in the first plurality of frames that are corrupt;
    generating for display at the local device the second frame in response to determining that the number of frames is greater than a threshold maximum number of frames being corrupt; and
    generating for display at the local device the first frame in response to determining that the number of frames is less than the threshold maximum number of frames being corrupt.

11. A system for playing media, the system comprising:
storage circuitry of a local device configured to store a plurality of media assets; and
control circuitry configured to:
    receive a user input requesting playback on the local device of a first version of a media asset on, wherein the first version of the media asset is selected from the plurality of media assets stored in the storage circuitry of the local device;
    retrieve, from the storage circuitry of the local device, a first frame of a first plurality of frames associated with the media asset;
    in response to determining that the first frame is corrupt:
        search a database that comprises a listing of a plurality of remote devices that store remote versions of the media asset to identify a remote device that stores a second version of the media asset, wherein identifying the remote device comprises:
            determine that the first frame matches a second frame of a second plurality of frames associated with the second version of the media asset; and
            determine that an encoding capability of the remote device matches an decoding capability of the local device; and
        in response to identifying the remote device:
            receive the second frame that was place-shifted from the remote device to the local device; and
            generate for display at the local device the second frame.

12. The system of claim 11, wherein the remote device is one of a plurality of remote devices storing the second version of the media, and wherein the control circuitry, when identifying the remote device storing the second version of the media asset, is further configured to:
    determine that the remote device is accessing the second version of the media asset at the second frame; and
    select the remote device based on the determination that the remote device is accessing the second version of the media asset at the second frame.

13. The system of claim 11, wherein the control circuitry, when determining that the first frame comprises is corrupt, is further configured to:
- compute a checksum for the first frame;
- compare the computed checksum to a checksum value associated with the frame; and
- determine that the frame comprises is corrupt when the computed checksum differs from the checksum value associated with the frame.

14. The system of claim 11, wherein the control circuitry, when determining that the first frame matches a second frame of a plurality of frames associated with the second version of the media asset, is further configured to:
- identify a first playback position corresponding to the first frame;
- identify a second playback position corresponding to the second frame; and
- determine that the first playback position matches the second playback position.

15. The system of claim 14, wherein content in the second version of the media asset differs from content in the media asset, and wherein the control circuitry, when determining that the first playback position matches the second playback position, is further configured to:
- identify content that differs between the media asset and the second version of the media asset; and
- normalize the first playback position and the second playback position by excluding the content from the normalized first playback position and the normalized second playback position.

16. The system of claim 11, wherein the first version of the media asset is stored in a first format in the storage circuitry of the local device, and wherein the second version of the media asset is stored in a second format, different from the first format, in the storage circuitry of the remote device.

17. The system of claim 16, wherein the control circuitry is further configured to:
- retrieve, from the storage circuitry of the local device, a profile for a user of the local device;
- identify, based on the profile, media display preferences associated with the user;
- determine an encoding parameter based on the media display preferences associated with the user;
- transmit, to the remote device, the encoding parameter; and
- receive, from the remote device, the second frame encoded in the first format based on the encoding parameter.

18. The system of claim 17, wherein the control circuitry is further configured to:
- identify a performance capability of a communication channel utilized by the local device for communication with the remote device; and
- modify the encoding parameter based on the performance capability.

19. The system of claim 16, wherein the second frame is received, by the local device, in a third format, different from the first and the second format.

20. The system of claim 11, wherein the control circuitry is further configured to:
- calculate a number of frames in the first plurality of frames that are corrupt;
- generate for display at the local device the second frame in response to determining that the number of frames is greater than a threshold maximum number of frames being corrupt; and
- generate for display at the local device the first frame in response to determining that the number of frames is less than the threshold maximum number of frames being corrupt.

* * * * *